US011374830B2

(12) United States Patent
Kidd et al.

(10) Patent No.: US 11,374,830 B2
(45) Date of Patent: *Jun. 28, 2022

(54) DYNAMIC SLICE BANDWIDTH MULTIPLEXING BASED ON SLICE PRIORITY

(71) Applicant: VMWARE, INC., Palo Alto, CA (US)

(72) Inventors: Robert Kidd, Champaign, IL (US); Raja Kommula, Cupertino, CA (US); Jeremy Tidemann, Urbana, IL (US); Constantine Polychronopoulos, Palo Alto, CA (US); Marc Andre Bordeleau, Shawinigan (CA); Edward Choh, Richmond (CA); Ojas Gupta, Mountain View, CA (US); Georgios Oikonomou, Patras (GR); Mingjie Zhao, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,795

(22) Filed: Dec. 20, 2019

(65) Prior Publication Data

US 2021/0067421 A1  Mar. 4, 2021

Related U.S. Application Data

(60) Provisional application No. 62/891,877, filed on Aug. 26, 2019.

(51) Int. Cl.
*H04L 12/911* (2013.01)
*H04L 12/851* (2013.01)
*H04L 12/933* (2013.01)
*H04W 28/20* (2009.01)
*H04W 28/24* (2009.01)
*H04L 41/5022* (2022.01)

(Continued)

(52) U.S. Cl.
CPC ...... *H04L 41/5022* (2013.01); *H04L 41/0896* (2013.01); *H04L 41/5006* (2013.01); *H04L 41/5025* (2013.01); *H04L 45/507* (2013.01); *H04L 47/805* (2013.01); *H04L 49/101* (2013.01); *H04W 28/20* (2013.01); *H04W 28/24* (2013.01); *H04W 76/12* (2018.02)

(58) Field of Classification Search
None
See application file for complete search history.

(56) References Cited

U.S. PATENT DOCUMENTS

2015/0351118 A1* 12/2015 Arnott ................... H04W 16/14
370/252
2017/0331670 A1* 11/2017 Parkvall ............... H04J 11/0056

(Continued)

*Primary Examiner* — Scott M Sciacca
(74) *Attorney, Agent, or Firm* — Clayton, McKay & Bailey, PC (57) ABSTRACT

In a slice-based network, slice multiplexers can be used to anchor inter-cloud tunnels across different clouds in a slice path. The slice multiplexers can dynamically change a total allocated bandwidth of an outer tunnel and reconfigure relative slice bandwidths of inner tunnels. This can result in an optimized bandwidth allocation that enforces slice priorities, maintains required SLA performance levels, and minimizes total allocated bandwidth on the network connection. The dynamic changes can be based on slice priority levels, total number of slices, and historical slice throughput.

20 Claims, 6 Drawing Sheets

(51) Int. Cl.
    *H04L 41/5006*    (2022.01)
    *H04L 41/0896*    (2022.01)
    *H04L 41/5025*    (2022.01)
    *H04W 76/12*      (2018.01)
    *H04L 47/80*      (2022.01)
    *H04L 45/50*      (2022.01)
    *H04L 49/101*     (2022.01)

(56)    References Cited

U.S. PATENT DOCUMENTS

2019/0312823 A1    10/2019  Cui
2019/0394132 A1*   12/2019  Zhang .................. H04L 45/125
2020/0029250 A1*    1/2020  Ibek ................... H04L 41/0893
2021/0006979 A1     1/2021  Cui
2021/0037544 A1     2/2021  Andrews

* cited by examiner

DYNAMIC SLICE BANDWIDTH MULTIPLEXING BASED ON SLICE PRIORITY

CROSS-REFERENCE TO RELATED APPLICATIONS

This non-provisional application claims priority to provisional application No. 62/891,877, titled "Dynamic Slice Bandwidth Multiplexing Based on Slice Priority," filed Aug. 26, 2019. Application No. 62/891,877 is also incorporated by reference in its entirety.

BACKGROUND

Today's 3G, 4G, and LTE networks operate using multiple data centers ("DCs") that can be distributed across clouds. 5G technology is dramatically increasing network connectivity for all sorts of devices that will need to connect to the Telco network and share the physical network resources. Current network architectures cannot scale to meet these demands.

Network slicing is a form of virtualization that allows multiple logical networks to run on top of a shared physical network infrastructure. Using network slicing, the provider can partition the physical network to isolate tenant traffic and configure network resources at a macro level. Each slice can consist of a chain of virtual network functions ("VNFs") tailored to a particular use case. For example, Internet of Things ("IoT") devices, mobile broadband devices, and low-latency vehicular devices all need to share the 5G network. These different use cases have different functional requirements. For example, the IoT devices typically have a large number of devices but very low throughput. Mobile broadband will be the opposite, with each device transmitting and receiving high bandwidth content.

The performance requirements for a slice can be defined in a service level agreement ("SLA"). For example, the SLA can specify available bandwidth for a slice or maximum allowed packet latency. When multiple slices are allocated to the same physical hardware, these performance requirements can create bottlenecks. For example, the total reserved bandwidth for multiple slices can exceed the bandwidth capabilities of the hardware. Current technologies do not adequately prioritize slices based on quality-of-service ("QoS") to ensure more important slices maintain their performance requirements.

This QoS problem particularly persists for slices spanning multiple clouds. The system may not have full control of the underlying network connecting the clouds. For example, the connection may be a best-effort tunnel across the internet. Even when the system has more control over the network, a need exists to further minimize required resources used by the network service. For example, a multiprotocol label switching ("MPLS") network may allow reserving bandwidth along a label switched path, but the bandwidth requirements of a slice may vary over time. A fixed bandwidth reservation will waste resources during periods of low utilization. This in turn limits the number of slices that the network can support.

As a result, a need exists for new systems to enforce QoS for slices.

SUMMARY

Examples described herein include systems and methods for dynamically changing allocated bandwidth in a way that recognizes slice priority levels, enforcing slice QoS. Slice multiplexers can be used to anchor inter-cloud tunnels across different clouds in a slice path. The slice multiplexers can dynamically change a total allocated bandwidth of an outer tunnel and reconfigure relative slice bandwidths of inner tunnels. This can result in an optimized bandwidth allocation that enforces slice priorities, maintains required SLA performance levels, and minimizes total allocated bandwidth on the network connection. The dynamic changes can be based on slice priority levels, total number of slices, and historical slice throughput.

In one example, an orchestrator process creates a network connection between first and second slice multiplexers at different clouds. The network connection can be an inter-cloud tunnel or can include links across an MPLS network. The orchestrator, an agent on a server, or one of the slice multiplexers can determine that a first slice is utilizing less bandwidth across the network connection than the minimum specified in an SLA. Based on that determination, the slice multiplexer can reconfigure to increase the allocated bandwidth of other slices though the slice multiplexer based on the underutilization of the first slice. The relative increase can be based on slice priority level of the other slices.

In addition, the slice multiplexer can change a total allocated bandwidth for all slices, allowing for a reduction in total network bandwidth allocation. The slice multiplexer, an agent, or the orchestrator can compare a current bandwidth use of the network connection to the total allocated bandwidth. The current bandwidth accounts for the usage of the first and second slices, among any other slices using the multiplexer. Based on the comparison, the multiplexer can change the total allowed bandwidth of the network connection by setting limits at the first and second multiplexers. In effect, the multiplexer can enforce a new total allotted bandwidth. This can be less than a sum of minimum SLA bandwidth requirements, allowing for cost savings and also freeing up network bandwidth for other uses.

The slice priority levels of the first and second slices can be used in determining the new total allowed bandwidth for the network connection. For example, slice priority can be used as a weighting factor against the minimum SLA required bandwidth for that slice. A higher priority slice can be given a weighting factor closer to 1 relative to a lower priority slice, which can be given a weighting factor closer to 0.

The new total allowed bandwidth can also be based on historical slice throughput. If a slice historically does not use its allocated minimum SLA bandwidth, then the weighting factor can be further reduced. The new total allowed bandwidth can also be adjusted based on the number of slices utilizing the network connection through the slice multiplexers. The probability of all slices needing their optimum bandwidth reservation at the same time is inversely proportional to the number of slices. Therefore, as the number of slices increases, more reduction is acceptable for the new total allocated bandwidth.

To utilize the same slice multiplexers with multiple tenants, the orchestrator can set a crossbar switch to route packets between multiple slice multiplexers. The network connection can be an intercloud tunnel having an outer tunnel and multiple inner tunnels. The inner tunnels can correspond to different slices. To change the total allowed bandwidth, the slice multiplexers can enforce new limits on the outer tunnel. To change relative allowed slice throughputs, the multiplexers can enforce limits on the inner tunnels. The reconfigured limits at the first multiplexer can be mirrored at the peer slice multiplexer (e.g., second slice multiplexer).

In one example, the network connection can include a path through an MPLS network. The orchestrator can select different paths based on links in the MPLS network. These links can be changed to reroute the network connection based on which links reach bandwidth capacity.

These stages can be performed by virtual components in one or more clouds that follow a method, in an example. The stages can be part of a system that includes, for example, an orchestrator that programs the slice multiplexers or causes an agent in the cloud to carry out the stages. Alternatively, a non-transitory, computer-readable medium including instructions can cause a processor at the switch to perform the stages when the processor executes the instructions. The term "switch" can broadly refer to any device performing network functionality, such as a server, router, or host.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, the system can control pairs of multiplexers that establish a network connection across different clouds. The system can control priority of slices within the network connection across the multiplexers, changing relative bandwidths of those slices. The system can also control the total bandwidth for the multiplexers, changing the threshold of total bandwidth for all of the slices using the link. The multiplexers can be virtualized and controlled by an orchestrator process that dynamically adjusts both the total bandwidth and per-slice bandwidth of the network connection between the multiplexers.

By changing settings at the multiplexers, the orchestrator can dynamically change (1) the relative per-slice bandwidths of the inner tunnels and (2) the maximum allowed bandwidth of the outer tunnel. The dynamic changes can be based on both slice QoS priority levels and current bandwidth usage levels. The goal, in general, can be to maintain SLA performance requirements for each slice while also minimizing the total amount of bandwidth required in the network. Therefore, the system can dynamically change both types of bandwidth limits to maintain slice-based SLA requirements while accounting for QoS levels of the different slices, all while minimizing usage of the shared physical infrastructure. This can allow different tenants to share unutilized bandwidth, maximizing use of available infrastructure and minimizing costs.

The intercloud network connection between the multiplexers can include any type of network path. For example, the network connection can be implemented with an intercloud tunnel, such as an IP security ("IPSec") tunnel. Alternatively, the network connection can be a multi-link path in a MIMS network. The network connection can include an outer tunnel with a maximum allowed bandwidth, and multiple slice-based inner tunnels that have their own per-slice minimum bandwidth. The bandwidths of the outer tunnel and inner tunnels can be dynamically adjusted by the orchestrator based on slice QoS and current bandwidth utilization. In one example, links between the clouds can also be controlled by the orchestrator to reroute the network connection. This affords the orchestrator even more flexibility in adjusting network utilization, including bifurcating the network connection between the multiplexers.

Figure 1:
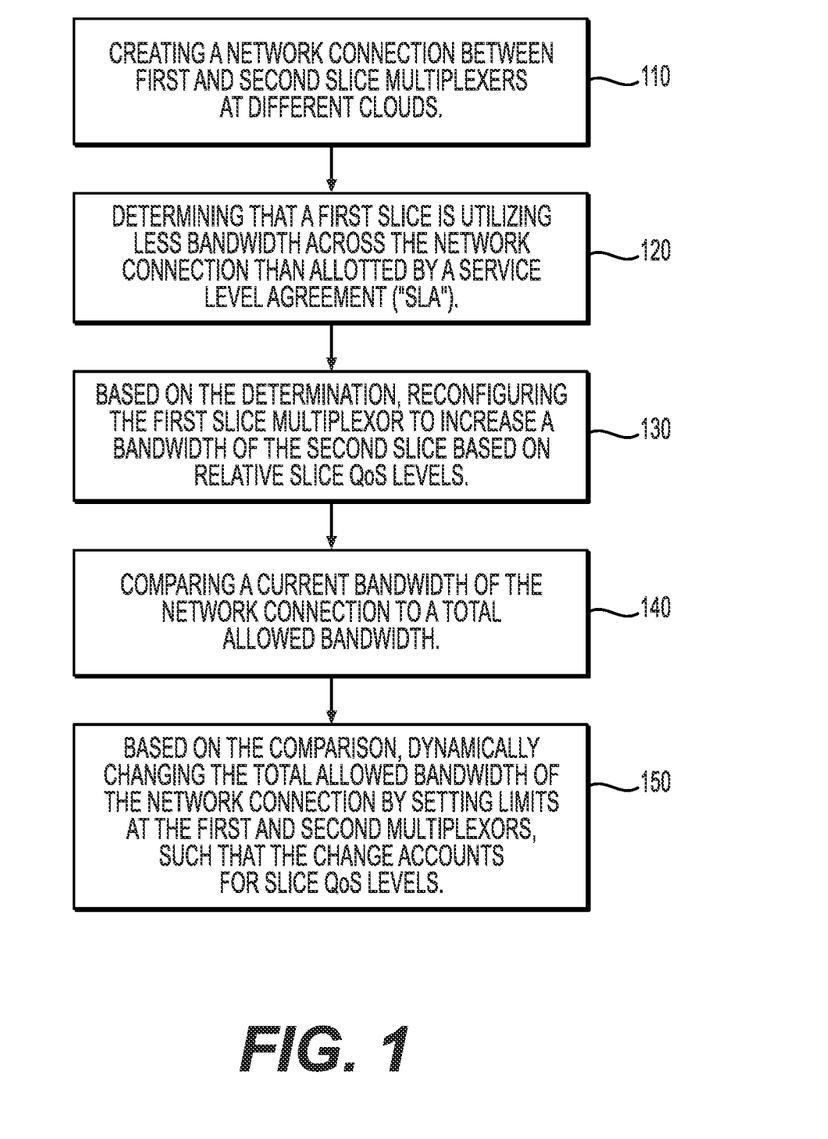
FIG. 1 is a flowchart of an example method for slice-based enforcement of QoS using multiplexing.

FIG. 1 is an example flowchart for a method of enforcing slice based QoS using multiplexing. At stage 110, an orchestrator process can create a network connection between first and second slice multiplexers at different clouds. The orchestrator can manage virtual slice networks ("VSNs") for multiple tenants.

In one example, the orchestrator determines that a tenant VSN needs to stretch a slice across multiple clouds. This determination can be based on a number of factors, such as where users are connecting to the network and where a backend server or other destination is located. The orchestrator can then configure connections between the tenant's service function chain ("SFC") steering node and the slice multiplexer in each cloud. This can cause packets assigned to particular slice IDs to be routed to the slice multiplexers. The slice multiplexers can be virtualized switches, in one example. The first slice multiplexer can execute on a first server in a first cloud and the second slice multiplexer can execute in a second server in a second cloud.

In one example, the first slice multiplexer receives packets from any slices in its local cloud that need to communicate with slices in a remote cloud. In another example, multiple slice multiplexers exist in the first cloud, and different slice traffic is routed to each based on slice ID. Slice multiplexers can act as choke points that spans all slices and tenants. This can allow the orchestrator to utilize the slice multiplexers to shape and prioritize completing traffic flows. As will be explained, the orchestrator can change the relative limits of slice traffic between slices and also change a total allowed bandwidth of the slice multiplexers.

In more detail, for a particular slice, when the slice segment in the first cloud needs to send a packet to the segment in another cloud, that packet can be routed toward the slice multiplexer. The slice multiplexer can receive the packet and apply rate limiting and prioritization according to a configuration of all slices traversing the multiplexer. From there, the slice multiplexer can forward the packet to a peer slice multiplexer in a remote cloud. Logically, the slice multiplexer can accept packets from N slices on one side and multiplex those packets onto a single network connection to its peer. In the remote cloud, the peer slice multiplexer acts as a demultiplexer to perform the inverse operation. The peer slice multiplexer can then forward the packet to a local SFC steering node for the slice. From there, the slice processing can continue as normal.

In one example, the orchestrator can establish a path from the first slice multiplexer to the second (i.e., from local to peer) as part of creating the network connection. This can include creating an inter-cloud tunnel between the first and second multiplexers. The slice management system, including the orchestrator, may not have full control of the network connecting the two clouds in an example. Therefore, the tunnel can be a best-effort tunnel across the internet. In other cases, the slice management system can have more control over the network. For example, an MPLS network can allow for reserving bandwidth along a label switched path from the first multiplexer to the second multiplexer. Slices can have different paths through the network. However, common jumps between nodes can utilize the same tunnel between the first and second multiplexers.

Regardless of the level of control over the network connection, the slice multiplexers can be used to prioritize data flows respective to slices. This can be advantageous even with respect to network connections that the slice management system can control. This is because the bandwidth requirements of a slice can vary over time, so a fixed bandwidth reservation can waste resources during periods of low slice utilization. As will be described, the slice management system can use the multiplexers to address this issue.

At stage 120, the orchestrator or other component can determine that a first slice is utilizing less bandwidth across the network connection than allotted by an SLA. SLAs can establish performance requirements for a slice. For example, each slice can have guaranteed performance characteristics, such as threshold levels of latency, throughput, and bandwidth. SLA records can explicitly assign prioritization parameters, in an example, that are used by the orchestrator or a programmable switch for load balancing purposes.

The performance requirements can differ between tenants based on different SLA performance requirements and the specific use cases for the slice. For example, IoT devices will typically have a large number of devices but very low throughput. Mobile broadband will be the opposite, with each device transmitting and receiving high bandwidth content. The VNFs making up the slice path can be specific to each use case, with video streaming being optimized differently than voice phone calls. In addition to the different use cases, different tenants can pay different amounts to the service provider to obtain different levels of guaranteed performance. To reserve more bandwidth, higher throughput, or guarantee lower latency, a tenant can pay more money. Based on the use cases and the tenant-specific SLA requirements, the service provider can then classify slices for QoS purposes. Slices can be assigned different QoS levels, allowing for prioritization based on programming a virtual switch that utilizes the multiplexer or by programming the virtualized multiplexer itself.

In one example, the slice multiplexer or some other component in the cloud can determine the relative bandwidths used by the slices across the network connection. For example, code in the multiplexer can count or estimate ingress or egress data on a per-slice basis. In another example, an agent running in the first or second cloud can track performance related data on a per-slice basis. The agent can execute in a physical or virtual layer of a server, for example. Executing in the physical layer can require less processing costs in an example. The agent can send bandwidth utilization information back to the orchestrator or to the slice multiplexer itself. The agent can periodically report information regarding bandwidth, latency, throughput, round-trip time, or other telematics. The agent can report on a per-slice basis, such that the orchestrator can analyze slice performance separately. The orchestrator can then determine that a slice's utilized bandwidth is less than allotted in an SLA for that slice.

If the utilized bandwidth of a slice is below the SLA requirement by a threshold amount, then at stage 130 the first slice multiplexer can be reconfigured. In one example, each slice being routed between the first and second slice multiplexers can have a minimum guaranteed bandwidth through the multiplexers. The actual traffic throughput of a given slice can be less than the slice's minimum. During these periods, the slice multiplexers can be reconfigured such that other slices can use extra bandwidth in proportion to their configuration. As an example, a network can have three slices, allocated 50%, 30%, and 20% of the link bandwidth. If the throughput on the 50% slice is 10% at some point in time, the remaining 40% can be used by the second and third slices in a 3:2 ratio. This is illustrated in Table 1, below.

TABLE 1

| Slice | Allocated bandwidth share | Actual throughput allowed based on reconfiguration |
| --- | --- | --- |
| 1 | 50% | 10% |
| 2 | 30% | 54% [30% + (40% * 3/5)] |
| 3 | 20% | 36% [20% + (40% * 2/5)] |

In one example, the slice multiplexer can be set by the orchestrator to reconfigure itself. This can occur, for example, when the slice multiplexer or another component recognizes that a slice's actual throughput is a threshold amount below its allocated bandwidth share. In such case, the slice multiplexer can reconfigure to allow other slices to achieve higher actual throughput. This can allow the slice multiplexer to dynamically change the actual throughput allowed without constantly needing recognition and permission from the orchestrator. However, in another example, the orchestrator can send a command to the first slice multiplexer to cause the reconfiguration and establish the allowed actual throughput. For example, the orchestrator or agent can increase an allowed bandwidth of the second slice and decrease an allowed bandwidth of the first slice.

The relative increase in bandwidth of the second slice and decrease of the first slice can be based on relative QoS levels of those slices. The QoS levels can also be referred to as priority levels. The priority levels can determine which slices to prioritize for bandwidth or performance purposes. Relative to a lower priority slice, a higher priority slice can have its bandwidth reduced less at the slice multiplexer when it is not using the amount required by the SLA. The higher priority slice can also be given more additional bandwidth when another slice's bandwidth is reduced at the slice multiplexer. With regard to the Table 1 example, if the first slice has a low priority, then all 40% of its unused allocated bandwidth can be distributed as allowed throughput to other slices. But if the first slice instead has a relatively high priority, less than the full 40% may be distributed in an example.

In one example, the slice multiplexer can determine slice priority levels based on the actual allocations received from the orchestrator. For example, under that approach the slice priority levels of Table 1 would rank the first slice ahead of the second slice, which in turn would be ranked ahead of the third slice.

In another example, a table set by the orchestrator and accessible by the slice multiplexer can include priority levels for the slices. This can allow the slice multiplexer to reconfigure according to those priority levels when some slices are not using their allotted bandwidth. This can be advantageous, for example, when a low priority slice is given a high allotment of bandwidth. For example, a video streaming slice can be lower priority than an emergency call or automated driving slice, even if more bandwidth is used for video streaming. Therefore, using an additional slice priority table can allow for reconfiguring the multiplexers in a way that ensures the higher priority slices are given the additional available bandwidth.

To this end, in one example, the reconfiguration can also be triggered by a high priority slice that needs more bandwidth than currently allocated. This can mean that even if a low priority slice is not a threshold amount below its allocated bandwidth, the slice multiplexer can reconfigure anyway based on the additional bandwidth needs of the higher priority slice.

During reconfiguration, slices of the same priority level can receive different additional amounts of actual throughput based on which of those slices needs bandwidth the most. In the above example, if the third slice is currently at the maximum allocated bandwidth and the second slice is not, then the ratio of actual allowed throughput can scale more towards the third slice. In one example, the agent, orchestrator, or slice multiplexer can determine which slices need more or less bandwidth. This can be based on how far below a slice's actual bandwidth is with respect to that slice's bandwidth limit at the slice multiplexer. When a first slice is categorized as needing less bandwidth and a second slice is categorized as needing more bandwidth, the slice multiplexer can reconfigure the actual throughput accordingly.

At stages 140 and 150, the system can also change the total allowed bandwidth across slice multiplexers for the network connection—not just the relative bandwidths per-slice. This can allow the slice multiplexers to maintain reduced overall network bandwidth as a ceiling for all of the slice traffic. Decreasing the total bandwidth allocated to the network connection can allow a tenant or service provider to save money. It also can free up the allocated bandwidth for other uses on the network, such as for different network connections between the same or different clouds.

At stage 140, the slice multiplexer, orchestrator, or another component can compare a current bandwidth of the network connection to a total allocated (i.e., allowed) bandwidth. The total can be determined by adding up the bandwidth allocation of the individual slices in one example. In another example, the total allocation is set by the orchestrator and the individual slices are just allocated percentages of the total allocation. The current bandwidth, on the other hand, can be total used bandwidth across all of the slices at a point in time or over a period of time.

In one example, the slice multiplexer can determine its own current bandwidth (i.e., total actual throughput) and report periodically to the orchestrator or some other component. When the current actual bandwidth usage is less than the allocation by some threshold amount, the slice multiplexer pair can dynamically lower the total allowed bandwidth. When more bandwidth is needed, the slice multiplexer pair can dynamically raise the total allowed bandwidth.

In another example, the current bandwidth can be detected by an agent operating in the physical layer of the network. For example, a physical switch used to route traffic across the network connection can be programmed to execute the agent, which can periodically report slice-specific performance data to the orchestrator. The orchestrator can then determine that the total allocated bandwidth of the slice multiplexer pair should be decreased or increased. In one example, when the slice multiplexer changes the total allowed bandwidth, it can treat the initial allocation as a ceiling. This can allow the slice multiplexer to decrease the total allowed bandwidth during slow periods but increase it back to the initial allocation when bandwidth increases again.

At stage 150, the system can dynamically change the total allowed bandwidth of the network connection. This can include limiting the total bandwidth of both multiplexers in the pair. The change can account for slice QoS (i.e., priority) levels. For example, if the multiplexers are routing traffic for a higher priority set of slices, then the reduction of the total allowed bandwidth can be less than it would be if the set of slices were of lower priority.

For a tunnel network connection, the system can reduce the total allowed bandwidth by changing the bandwidth limit of the outer tunnel. The inner tunnels, representing individual slices, can be changed proportionally or otherwise based on the outer tunnel change. Dynamically changing the total allowed bandwidth in this way can decouple the bandwidth of the outer tunnel from the sum of guaranteed minimum bandwidths for each slice. Instead, since it is common for less than all of the slices to require peak bandwidth at the same time, the outer tunnel can be configured with a bandwidth lower than the sum of required slice bandwidths. Utilizing stages 120 and 130 can also help reduce the total allowed bandwidth at stage 150 since at least one slice is not using its minimum share, allowing the other slices to use that bandwidth and reducing the total allocation. In other words, this combination can allow for reducing overall network connection bandwidth allocation while maintaining guaranteed minimum bandwidths for at least some higher priority slices.

The bandwidth allocated for the outer tunnel can be a function of several parameters. These can include the number of slices passing through the slice multiplexer, the distribution of slice priority levels, and past slice throughput. For example, as the number of slices increases, so does the probability that at least one slice will not use its full bandwidth allocation at a given point in time. The bandwidth configured for the outer tunnel can therefore be reduced to less than the aggregate guaranteed slice bandwidth as the number of slices increases.

Distribution of slice priorities can impact how much to reduce the total allowed bandwidth. When unused bandwidth is available, it will be offered to higher priority slices before lower priority slices, as explained with regard to stage 130. It can be less detrimental for a low priority slice to fall short of its SLA requirements occasionally. If most slices are high priority, the bandwidth configured for the outer tunnel can be higher than if most slices are low. When summing slice bandwidths to compute the outer tunnel bandwidth, the system can apply a factor to each slice bandwidth to weight its contribution to the total. High priority slices can be weighted to contribute more to the total than low priority slices.

Past slice throughput can also be used to predict the likelihood that a reduced total allowed bandwidth will impact performance. For example, the orchestrator or some other component can use historical throughput data from a slice to estimate how much of the requested minimum bandwidth that slice is likely to use. The slice's contribution to the outer tunnel bandwidth can therefore be weighted by how much of its requested bandwidth the slice used in the past.

Figure 2:
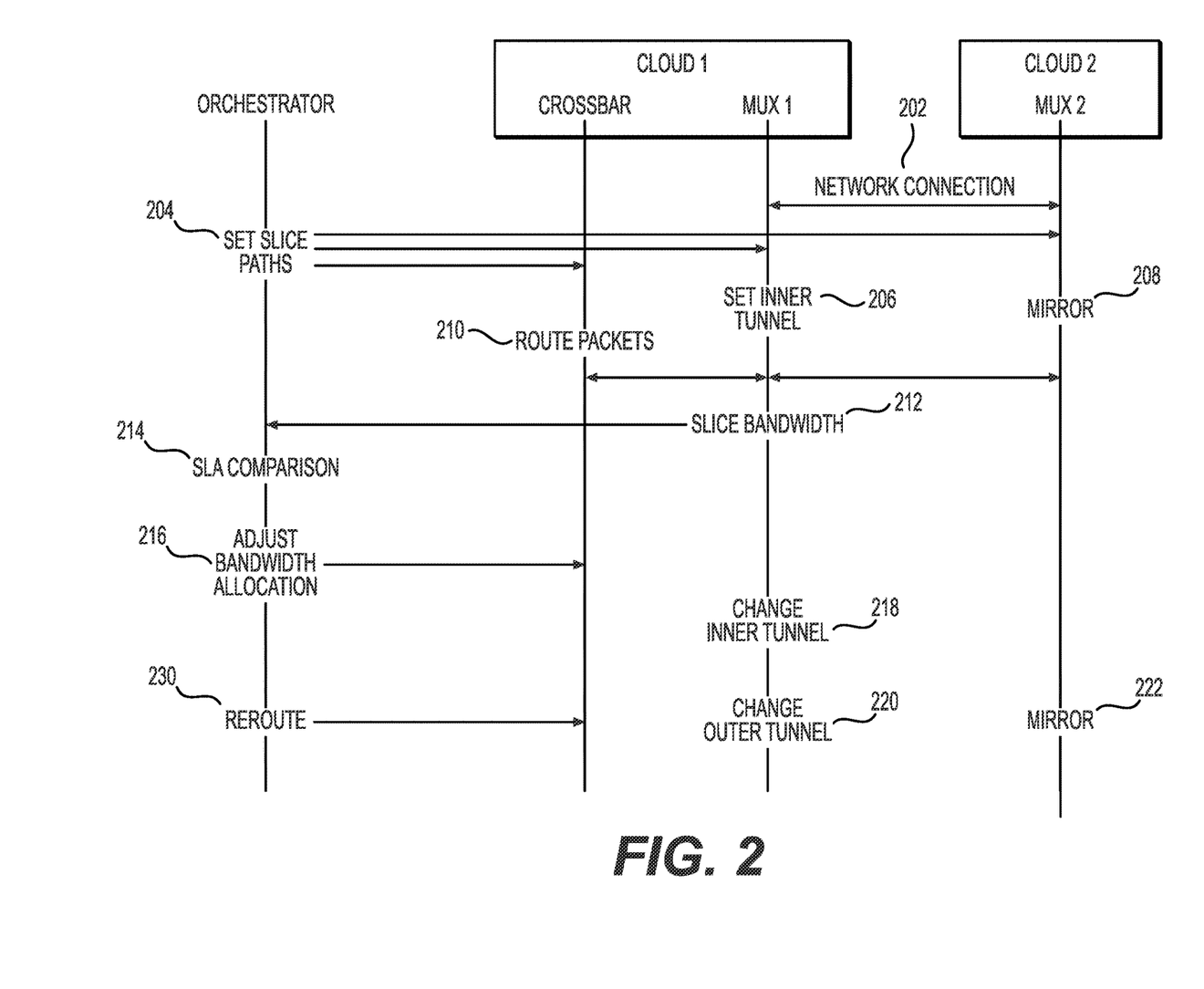
FIG. 2 is an example illustration of a sequence diagram for slice-based enforcement of QoS using multiplexing.

FIG. 2 is an example sequence diagram for using slice multiplexers to enforce QoS. At stage 202, the orchestrator can cause a network connection to be created between first and second clouds. A first slice multiplexer can connect to a second slice multiplexer over the network connection. As has been discussed, this pair of slice multiplexers can transport separate packet flows between the clouds while attempting to satisfy SLA requirements. The packet flows can represent the data plane for slices belonging to different tenants. However, the packet flows can also contain control or management data for the VSN system or tenant infrastructure. These additional data types can be supported by using a tunneling mechanism for the network connection at stage 202.

Control and data plane separation can be achieved within the network connection in multiple ways. One option is to allocate additional inner tunnels to carry control traffic. Alternatively, a separate slice multiplexer pair (not illustrated) with a dedicated outer tunnel could be used. Each approach can have advantages. If control and data plane traffic traverses the same link between clouds, adding inner tunnels can be advantageous. Traffic shaping on the slice multiplexer pair can prioritize control traffic above data traffic, ensuring the control plane stays up regardless of data plane traffic. This can be done by prioritizing the inner tunnel for control data relative to the other inner tunnels. Alternatively, using a separate outer tunnel can allow the control plane to use a different external network link than the data plane. This can ensure that control plane traffic is not affected by data plane volume.

At stage 204, the orchestrator can set components within the first cloud to route slice data to the first multiplexer. In one example, this is done as part of setting a variety of components to route slice data according to slice path. Each slice can have different slice paths based on the VNFs in the service chain for the respective slice and the locations of those VNFs. For example, switches or other network elements can determine a next hop for the packet based on the slice ID. A hop can reflect where the packet is sent next, and can be at a remote cloud in some examples. A route table, which can be set by the orchestrator, can return information regarding the slice path for that slice ID, including the next hop. The route table can be located locally on a switch. Routers can be updated to include slice tables (one type of routing table) that correlate packet header information to slice ID. This can allow the switch to use the packet header that includes address information to look up the slice ID. For example, the packet header can list source and destination media access control ("MAC") addresses, source and destination internet protocol ("IP") addresses, source and destination ports, and indicate a packet protocol. With this information, the switch can identify a slice ID in a local slice table. An example slice table is shown below, as Table 2.

TABLE 2

Slice Table

| Source IP | Dest IP | Source Port | Dest Port | Protocol | Slice ID |
|---|---|---|---|---|---|
| 192.168.100.10 | 10.1.2.10 | 1111 | 2222 | 6 | 1 |
| 192.168.100.11 | 10.2.3.11 | 3333 | 4444 | 6 | 2 |
| 192.168.100.12 | 10.3.4.12 | 5555 | 6666 | 17 | 3 |

In one example, the agent can use source IP address ("Source IP"), destination IP address ("Dest IP"), source port, destination port, and a protocol type to find the correlated Slice ID. The protocol type can be represented as a number in one example, with different numbers correlating to different packet types.

Setting the slice paths in stage 204 can include setting a crossbar switch to route packets to the first slice multiplexer based on slice ID. The crossbar switch can be a virtual component that can select between multiple slice multiplexers at the first cloud. Whereas a first slice ID can correspond to the first slice multiplexer, a second slice ID can be handled by a different slice multiplexer. The crossbar switch can be updated to send packets to the correct slice multiplexer. The orchestrator can update the crossbar switch to change its slice-based routing criteria as changes occur to the slice paths in the network.

The network connection of stage 202 can be created as part of setting the slice paths at stage 204, in an example. This is because the slice paths themselves can dictate that slice traffic from the first cloud be sent to the second cloud. Therefore, a tunnel having an outer tunnel and inner tunnels can be created at stage 202. The inner tunnels can be set at stage 206. This can include allocating bandwidth according to SLA requirements. Each inner tunnel can represent a different slice. The bandwidth allocated to each tunnel can therefore be based on the SLA requirements of the respective slice. In one example, the total bandwidth allocated to the outer tunnel can be less than the sum of inner tunnel allocations. As explained above with regard to FIG. 1, stage 150, the allocation can be based on the number of slices passing through the slice multiplexer, the distribution of slice priority levels, and past slice throughput.

The settings of the first slice multiplexer can be mirrored at the second slice multiplexer in the second cloud at stage 208. This can ensure that the slice multiplexer pair works the same at both ends, in an example. Therefore, the orchestrator can set the pair to recognize the same inner and outer tunnel actual allowed throughput.

Once the slice paths are set, packets can be routed along those paths. At stage 210, routing packets for a slice can include receiving packets at the crossbar switch. Based on slice ID, the crossbar switch can send the packets to the first slice multiplexer. The first slice multiplexer can send the packets in a corresponding inner tunnel across the network connection to the second slice multiplexer.

At stage 212, slice bandwidth information can be reported to the orchestrator in an example. The report can be generated by one of the slice multiplexers or an agent monitoring slice traffic.

At stage 214, the orchestrator can compare the slice bandwidth against SLA requirements. The orchestrator can also compare the current bandwidth usage of the network connection to the allocated total bandwidth. Based on these comparisons, the orchestrator can dynamically adjust bandwidth allocation of the slice multiplexer pair at stage 216. This can include changing the total bandwidth allocation of the outer tunnel and the relative allocations of the inner tunnels. Changes to the outer tunnel total bandwidth allocation can occur before, after, or at the same time as the changes to the relative inner tunnel allocations. FIG. 2 illustrates changing the inner tunnel bandwidth at stage 218 prior to changing the outer tunnel allocation at stage 220, but these changes can occur simultaneously, in an overlapping fashion, or in reverse order.

As has been explained, the bandwidth changes for the outer tunnel at stage 220 can be based on multiple factors. The greater the number of slices that pass through the pair of slice multiplexers, the more the total allowed bandwidth can be reduced. This is because it is increasingly unlikely that every slice will need its minimum allocated bandwidth at a given time. More reduction can be afforded for low priority slices as compared to high priority slices. So, the system can apply a weighting factor to each slice when determining the outer tunnel bandwidth allocation. Additionally, past slice throughput can inform on the probability of a slice needing its entire allotted bandwidth. If the slice has historically used less than the minimum bandwidth allotted, the weighting factor for that slice can be increased accordingly. The weighted bandwidth allocations for each slice in the network connection can then be summed to determine a total allowed bandwidth value. The outer tunnel can then be changed to limit bandwidth to this new total allowed bandwidth value.

Within the confines of the total allowed bandwidth of the outer tunnel, the relative configuration of bandwidth percentages to the inner tunnels can also dynamically change at stage 218. The pair of slice multiplexers can be reconfigured based on a slice using less than its minimum allocation and allocating that difference to other slices. The allocation to those slices can be based on the priority levels of the slices, with higher priority slices getting larger proportional allocations than the lower priority slices.

The changes to the outer and inner tunnels can be mirrored at the second multiplexer in the second cloud at stage 222. This can ensure that both multiplexers recognize the same traffic limitations for proper usage of the network connection.

Figure 3:
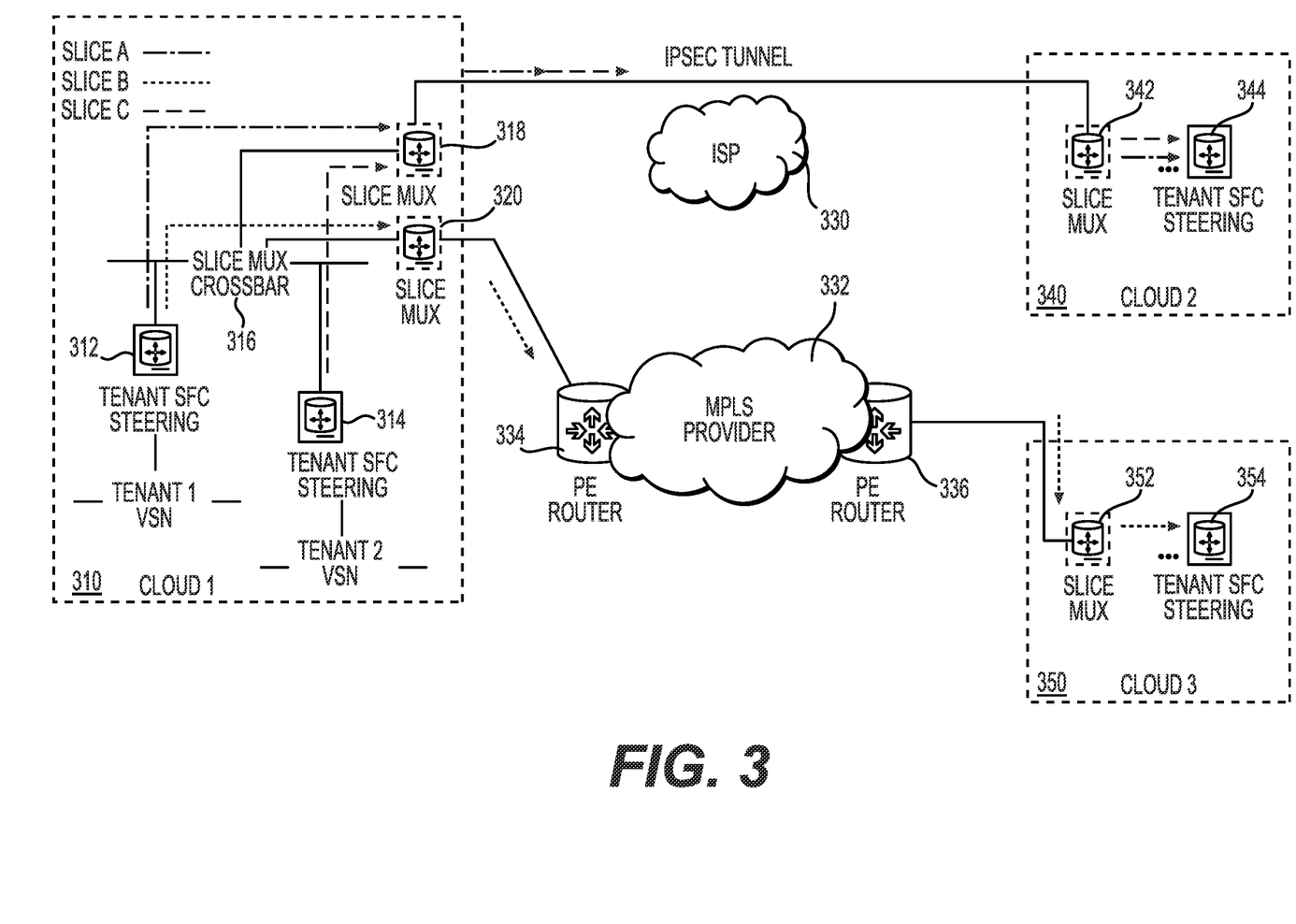
FIG. 3 is an example illustration of system components for slice-based enforcement of QoS using multiplexing.

FIG. 3 is an example system diagram illustrating components used in enforcing slice based QoS using slice multiplexers. In this example, the slicing system accommodates two different tenant VSNs. The first cloud 310 includes two different slice multiplexers 318, 320 and a crossbar switch 316. The slice multiplexers 318, 320 are shared among the tenants, both of which deploy slices that span to other clouds. A first pair of slice multiplexer 318, 342 anchors a network connection between the first cloud 310 and second cloud 340. The network connection can be an IPSec tunnel that spans an external internet service provider ("ISP") network 330. The network provider may have limited to no control over the ISP network, in which case the tunnel can be an advantageous network connection. The tunnel can be a best-effort tunnel across the public internet.

A second pair of slice multiplexers 320, 352 can anchor a second network connection. In this example, the second network connection is a private MPLS connection, but some other connection technology is also possible. The slice multiplexer 320 of the first cloud 310 can connect to a provider edge ("PE") router 334 of the MPLS network 332. The corresponding paired slice multiplexer 352 of the third cloud 350 can connect to a PE router 336 at the other side of the MPLS network 332.

Figure 4:
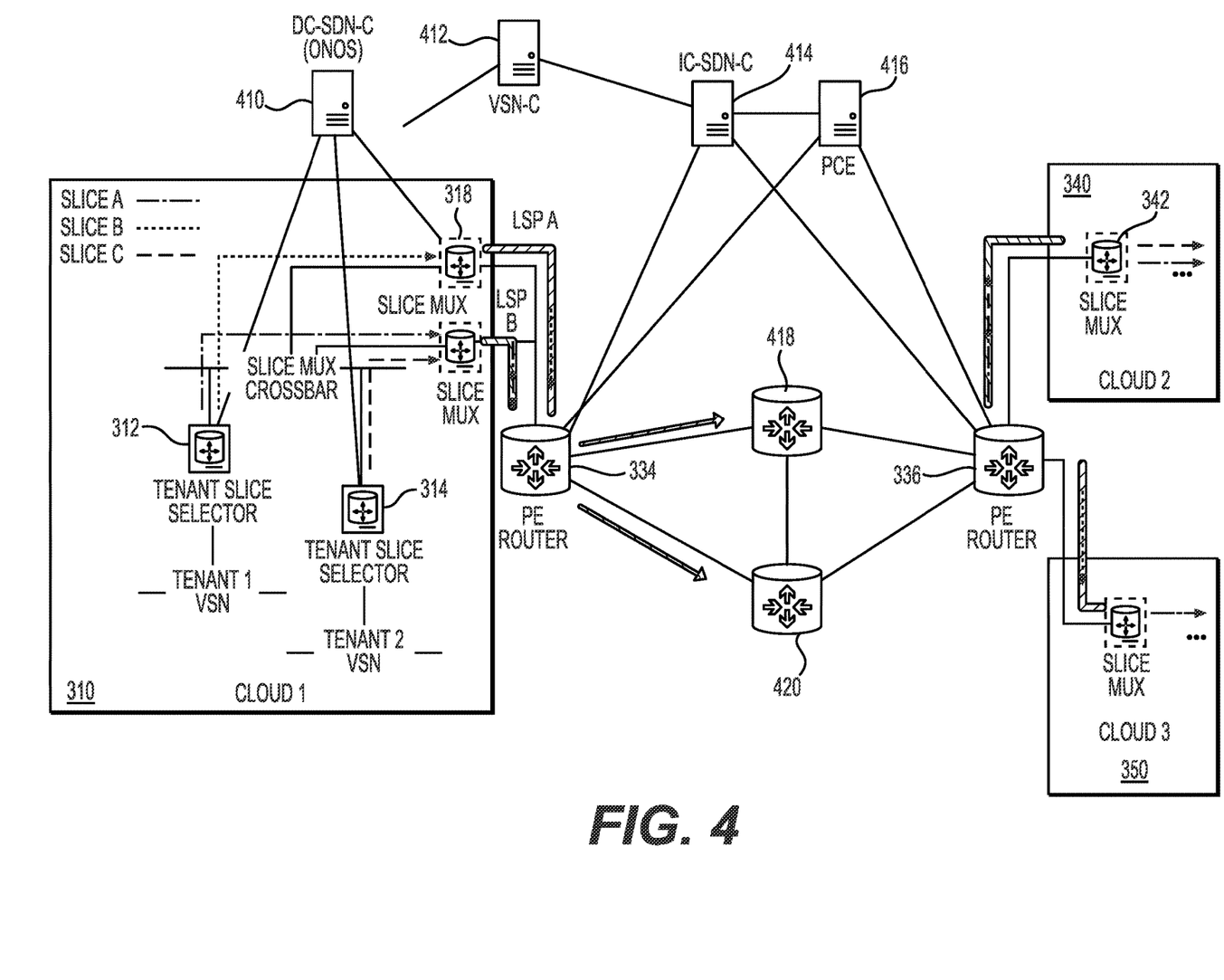
FIG. 4 is an example illustration of system components for slice-based enforcement of QoS using multiplexing.

When the VSN orchestrator determines that a tenant VSN needs to stretch a slice across multiple clouds, the orchestrator can configure connections between the slice's (e.g., tenant's) service function chain ("SFC") steering node and the slice multiplexer in each cloud. In the example of FIG. 4, SFC steering node 312 can be configured to connect to the crossbar switch 316, and in turn to slice multiplexers 318, 320, depending on the slice ID. Slice multiplexer 318 receives packets from any slices in its local cloud 310 that need to communicate with slice segments in a remote second cloud 340. Likewise, slice multiplexer 320 can receive packets from any slices in its local cloud 310 that need to communicate with slice segments in the third cloud 350. Each slice multiplexer 318, 320 is a choke point that spans all slices and tenants traversing to the second and third clouds 340, 350 respectively. This allows each slice multiplexer 318, 320 to shape and prioritize completing traffic flows to those clouds 340, 350.

At the point that a slice segment in the first cloud 310 needs to send a packet to a corresponding segment in the second cloud 340, the packet is transmitted to the slice multiplexer 318. The slice multiplexer 318 receives the packet and can apply rate limiting and prioritization according to the configuration of all slices traversing the slice multiplexer 318. The slice multiplexer 318 can then forward the packet to the peer slice multiplexer 342 in the second cloud 340. In the second cloud 340, the peer slice multiplexer 342 can forward the packet to the local SFC steering node 344 for the slice, and slice processing continues as normal. The same is true regarding packet prioritization and forwarding from slice multiplexer 320 to peer slice multiplexer 352 and SFC steering node 354.

Logically, a single slice multiplexer 318 can accept packets from N slices on one side and multiplex those packets onto a single network connection to its peer slice multiplexer 342. On the other end, the peer slice multiplexer 342 can act as a demultiplexer to perform the inverse operation.

By utilizing a crossbar switch 316 and different slice multiplexers 318, 320 for different clouds 340, 350, the system can scale as the slice network changes. This is because the traffic handled by any slice multiplexer instance 318 can be limited to the lesser of the aggregate bandwidth on the slice-facing side and the bandwidth of the connection 330 to the neighboring cloud 340. The bandwidth to the neighboring cloud is likely to be the limiting quantity in practice.

The system can also be configured without a crossbar switch 316, in an example. For example, the system can use a single slice multiplexer 318 to connect to one or more slice multiplexers 342, 352 in neighboring regions 340, 350. This can involve more complex routing rules on each slice multiplexer 318, 342, 352. However, increasing the load on a single slice multiplexer 318 can limit network scalability when the load reaches an upper limit.

The intercloud connections 330, 332 of FIG. 3 can be outside the control of the VSN system. The slice multiplexers 318, 342 can utilize point-to-point links provisioned by an outside entity for network connectivity.

Conversely, FIG. 4 illustrates system components in an environment where the VSN system can control routing across an MPLS network 334, 418, 420, 336. The components within the clouds 310, 340, 350 of FIG. 4 are otherwise the same as those of FIG. 3. When the connecting network between the clouds can be controlled, the orchestrator can further adjust the slice multiplexer 318 to react to changes in slice link utilization. In one example, the VSN system can configure a route across the MPLS using low performance, low cost links 418, 420. These are indicated in FIG. 4 by link slice path ("LSP") A and LSP B.

Once the capacity of a first link 418 is reached, the system can select an alternate route across higher capacity links 420. When a link 418 on a path reaches capacity, the VSN system can provision an additional path across the MPLS. Alternatively, the VSN system can instantiate an additional pair of slice multiplexers and move some slices to the new path.

Control over the MPLS can allow the VSN system to adjust slice paths to meet a latency requirement in addition to the bandwidth requirements discussed above. For example, the VSN system can adjust congestion on a link 418 and move slices that require low latency to an alternate path across the MPLS. Control over the MPLS can also improve resiliency. If a high capacity link in the path fails, the VSN system can provision one or more paths across lower performance links to reroute slice traffic.

Various control elements 410, 412, 414, 416 are shown for making changes to link slice paths. A software-defined network ("SDN") controller 410 can be used by the orchestrator to set the slice-based routing of the slice selectors 312, 314 and slice multiplexer 318. The SDN controller 410 can utilize an open network operating system ("ONOS") in an example. The SDN controller 410 can also communicate with a VSN controller 412 that sets routers 334, 336 to use various links 418, 420 for a slice path. To do this, the VSN controller 412 can send commands to various network controllers 414 and path computation elements ("PCEs") 416.

Figure 5A:
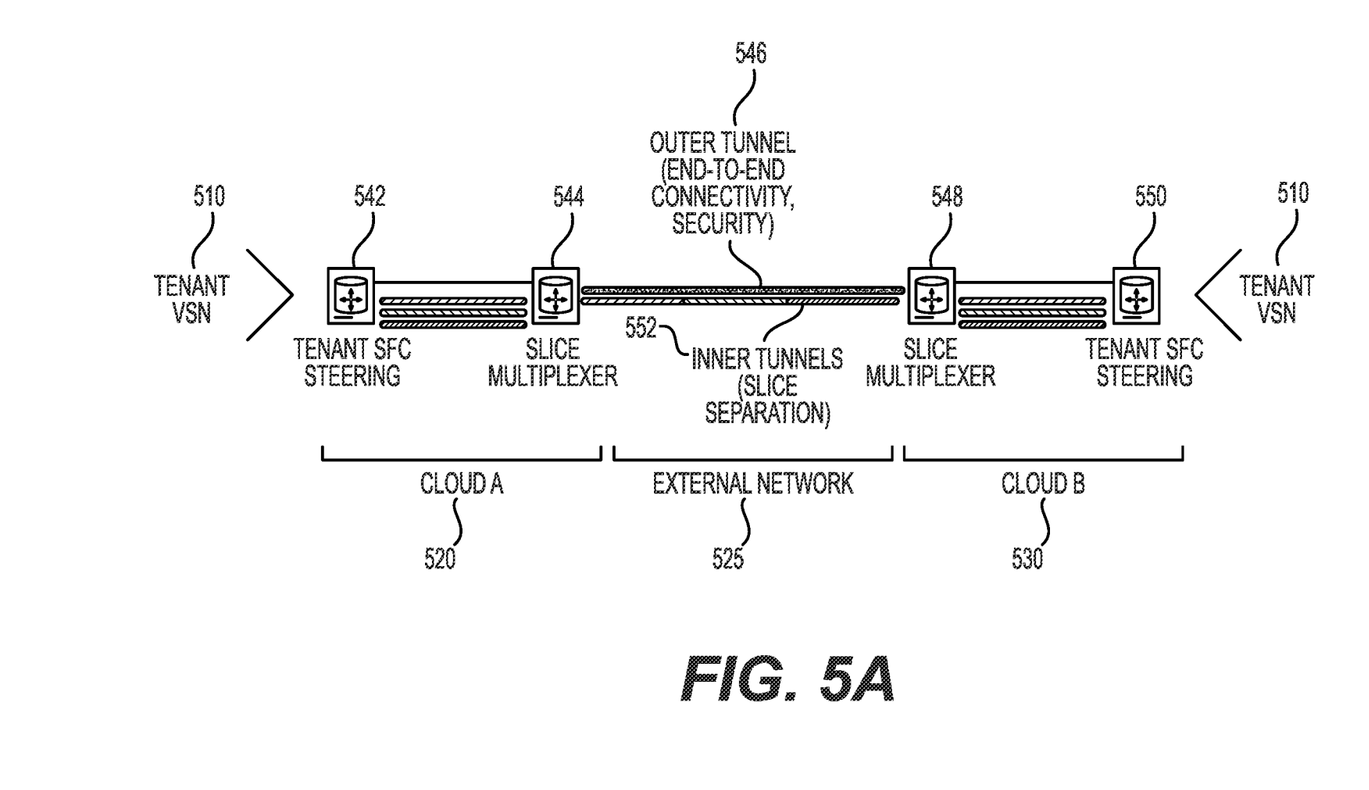
FIG. 5A is an example illustration of system components used for slice-based enforcement of QoS using multiplexing.
Figure 5B:
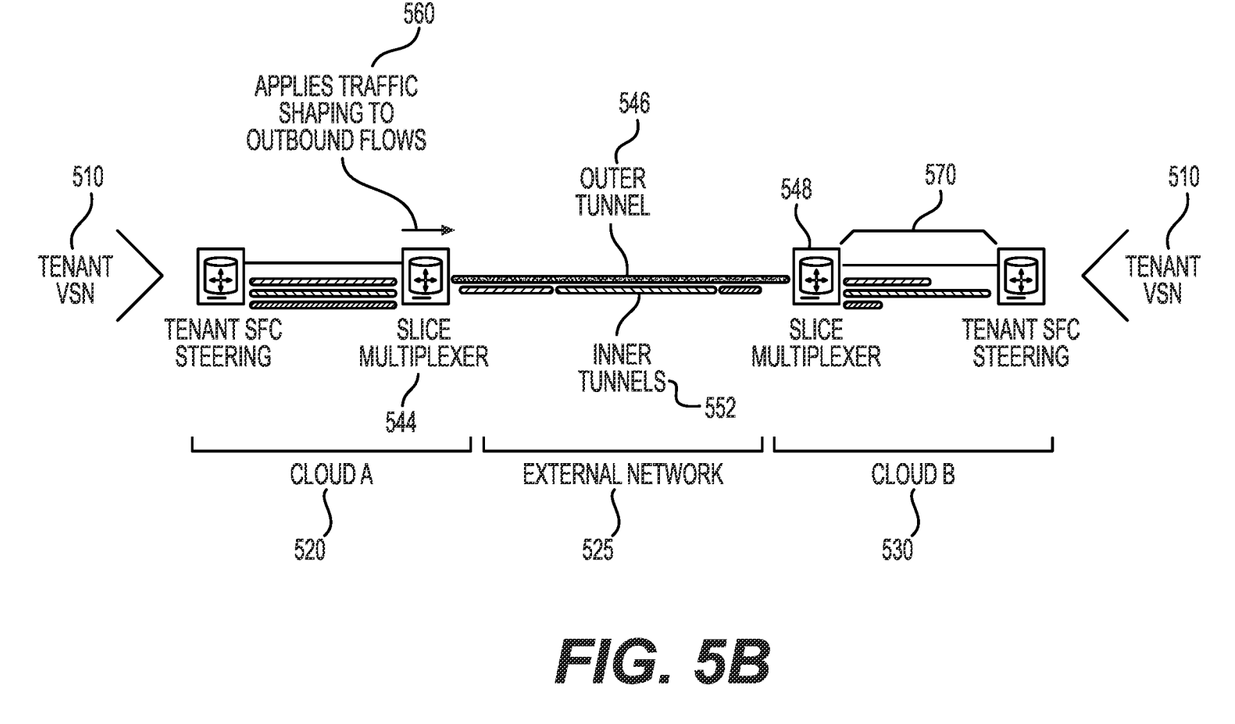
FIG. 5B is an example illustration of system components used for slice-based enforcement of QoS using multiplexing.

FIGS. 5A and 5B are example illustrations of a slice multiplexer pair 544, 548 that communicate across a best-effort intra-cloud tunnel. Starting with FIG. 5A, the intra-cloud tunnel can include an outer tunnel 546 and inner tunnels 552. The outer tunnel 546 can enforce overall bandwidth allocation, provide end-to-end connectivity, and security, such as through encryption. The inner tunnels 552 can be used for slice separation. Additionally, one or more inner tunnels 552 can be used for control plane information. These tunnels 546, 552 can connect two VSNs 510 in neighboring clouds 520, 530 across a best-effort internet connection through an external network 525. The inner tunnels 552 can be dedicated to each slice along each hop between the SFC steering node 542 in the local cloud and the steering node 550 in the remote cloud. Providing separate slice-based tunnels allows the slice multiplexers 544, 548 to track the packets that belong to each slice and apply traffic shaping as needed.

In FIG. 5A, networking in the external network region 525 can be broken into two layers, which visually represent the outer tunnel 546 and the inner tunnels 552. The outer tunnel 546 layer can establish connectivity between the two slice multiplexers 544, 548. Additionally, the outer tunnel 546 can provide secure transport of packets across the external network 525. The inner tunnel 552 layer can be responsible for tagging packets so traffic for each slice can be identified by the slice multiplexer 544 without modifying the packet payload. Depending on the software support and network technology used for the external network 525, the inner and outer tunnels 552, 546 may be combined into a single layer, in an example. The outer tunnel 546 can be an IPSec connection established between two NSX-T T0 routers, in an example. The inner tunnels 552 can be generic routing encapsulation ("GRE") tunnels established between the two slice multiplexers 544, 548. In one example, if the external network 525 is a private MPLS connection, the outer tunnel 546 can be eliminated. In that alternative scenario, the inner tunnels 552 could be implemented using a secure tunnel technology, such as GRE and IPSec. This can reduce or eliminate the need for the outer tunnel 546 across a public internet connection.

The slice multiplexers 544, 548 can enforce traffic shaping and prioritization on flows as packets are forwarded onto the inner tunnels 552. This is further illustrated in FIG. 5B. In FIG. 5B, a traffic shaping is applied on each slice multiplexer 544, 548 so packets traveling in both the upstream and configuration downstream directions are handled the same way. The traffic shaping can include reconfiguring the actual throughput allowed for the slices as well as changing the total allocated bandwidth of the network connection between slice multiplexers.

The outer and inner tunnels 546, 552 can be choke points subject to bandwidth reconfiguration at the slice multiplexers 544, 548. Since, in practical use, all slices likely will not require peak bandwidth at the same time, the system can configure the outer tunnel 546 by changing to a total allowed bandwidth that is lower than the sum of minimum SLA requirements of the slices of the inner tunnels 552. When a slice is not using its minimum allocated bandwidth share, the slice multiplexer 544 can apply traffic shaping at stage 560 to allow one or more other slices to use that leftover bandwidth. This reconfiguration can allow the slices to still reach their minimum guaranteed SLA performance requirements even when the total allocated bandwidth is lower than the full amount.

The total bandwidth allocated for the outer tunnel 546 can be a function of several parameters, as has been discussed. First, it can be based on the number of slices passing through slice multiplexer 544. As the number of slices increases, so does the probability that at least one slice of the inner tunnels 552 will not use its full bandwidth allocation at a given point in time. The bandwidth configured for the outer tunnel 546 can therefore be set progressively lower than the aggregate slice bandwidth as the number of slices increases.

Second, the change to total bandwidth allocation can be based on distribution of slice priorities. When unused bandwidth is available, it can be offered to higher priority slices before lower priority slices. It can be less critical for a low priority slice to miss its SLA requirements occasionally. If most slices are high priority, the bandwidth configured for the outer tunnel 546 can be higher than if most slices are low. In other words, a higher concentration of high priority slices can skew the total allocated bandwidth closer to the sum of minimum SLA requirements for the slices, even when the total allocated bandwidth is reduced. When summing slice bandwidths to compute the outer tunnel bandwidth, the system (e.g., the orchestrator) can apply a factor to each slice bandwidth to weight its contribution to the total. High priority slices would contribute more to the total than low. For example, a weighting factor for the highest priority slices can be 1, whereas a medium priority slice can be 0.8, and a low priority slice can be 0.5.

Third, these weighting factors can be adjusted based on past slice throughput. Historical throughput data from the slice can be used to estimate how much of the requested minimum bandwidth will be used. The slice's contribution to the outer tunnel 546 bandwidth can be weighted by how much of its requested bandwidth the slice used in the past. For example, a slice that stays below the minimum SLA requirement more than 95% of the time can cause the weighting factor for that slice to be multiplied by an additional 0.7. A slice that stays within a threshold level of its minimum SLA requirement more than half of the time can multiply the weighting factor by 1, leaving it unchanged in an example.

Fourth, the reconfiguration can account for inner tunnels 552 that are used for control and data plane communications. Those inner tunnels 552 can be maintained at a constant bandwidth to ensure that control or management data is not delayed or lost.

As has also been discussed, when multiple slices are assigned to the same outer tunnel 546, the rate shaper (e.g., orchestrator or agent) can be configured to enforce relative bandwidth allocations for each slice. Each slice can have a minimum guaranteed bandwidth. But the actual traffic throughput on a given slice will often be less than the slice's minimum. During these periods, other slices can use extra bandwidth in proportion to their configuration. An example has already been discussed with regard to Table 1, above.

The combination of the changes to the outer tunnel 546 and reconfiguration of the inner tunnels 552 can result in an optimized bandwidth allocation 570 that enforces slice priorities, maintains required SLA performance levels, and minimizes total allocated bandwidth on the network connection.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for intercloud slice connectivity, comprising:
   creating a slice multiplexer pair that connects traffic from a first cloud to a second cloud, the slice multiplexer pair including a corresponding slice multiplexer in each of the first and second clouds, each slice multiplexer of the pair comprising: multiple slice connections, each having a slice bandwidth allotment; and a total bandwidth allotment; and
   setting the total bandwidth allotment at both slice multiplexers of the pair as a function of the slice bandwidth allotments multiplied by weighting factors, wherein the weighting factors correspond to slice priority levels.

2. The method of claim 1, wherein packets are routed to different channels within the slice multiplexer pair based on a slice identifier.

3. The method of claim 1, further comprising adjusting the total bandwidth allotment and at least one slice bandwidth allotment based on a first slice using less than its corresponding slice bandwidth allotment.

4. The method of claim 3, wherein the total bandwidth allotment decreases and a slice bandwidth allotment for a second slice increases.

5. The method of claim 1, wherein multiple tenants share the multiple slice connections between the first and second clouds.

6. The method of claim 1, further comprising configuring connections between first and second service function chain steering nodes and the slice multiplexer pair.

7. The method of claim 6, wherein a controller sends commands to configure the connections, including connecting the first and second service function chain steering nodes to a crossbar switch, and wherein the crossbar switch routes first packets for a first set of slices to a first slice multiplexer and second packets for a second set of slices to a second slice multiplexer, both the first and second slice multiplexers being in the first cloud.

8. A non-transitory, computer-readable medium comprising instructions that are executed by a processor to perform stages for intercloud slice connectivity, the stages comprising:
   creating a slice multiplexer pair that connects traffic from a first cloud to a second cloud, the slice multiplexer pair including a corresponding slice multiplexer in each of the first and second clouds, the slice multiplexer pair comprising: multiple slice connections, each having a slice bandwidth allotment; and a total bandwidth allotment; and
   setting the total bandwidth allotment at both multiplexers of the pair as a function of the slice bandwidth allotments multiplied by weighting factors, wherein the weighting factors correspond to slice priority levels.

9. The non-transitory, computer-readable medium of claim 8, wherein packets are routed to different channels within the slice multiplexer pair based on a slice identifier.

10. The non-transitory, computer-readable medium of claim 8, the stages further comprising adjusting the total bandwidth allotment and at least one slice bandwidth allotment based on a first slice using less than its corresponding slice bandwidth allotment.

11. The non-transitory, computer-readable medium of claim 10, wherein the total bandwidth allotment decreases and a slice bandwidth allotment for a second slice increases.

12. The non-transitory, computer-readable medium of claim 8, wherein multiple tenants share the multiple slice connections between the first and second clouds.

13. The non-transitory, computer-readable medium of claim 8, the stages further comprising configuring connections between first and second service function chain steering nodes and the slice multiplexer pair.

14. The non-transitory, computer-readable medium of claim 13, wherein the configuration includes connecting the first and second service function chain steering nodes to a crossbar switch, and wherein the crossbar switch routes first packets for a first set of slices to a first slice multiplexer and second packets for a second set of slices to a second slice multiplexer, both the first and the second slice multiplexers being in the first cloud.

15. A system for intercloud slice connectivity, comprising:
   a non-transitory, computer-readable medium containing instructions; and
   a processor that executes the instructions to perform stages comprising:
      creating a slice multiplexer pair that connects traffic from a first cloud to a second cloud, the slice multiplexer pair including a corresponding slice multiplexer in each of the first and second clouds, the slice multiplexer pair comprising:
         multiple slice connections, each having a slice bandwidth allotment; and
         a total bandwidth allotment; and
      setting the total bandwidth allotment at both multiplexers of the pair as a function of the slice bandwidth allotments multiplied by weighting factors, wherein the weighting factors correspond to slice priority levels.

16. The system of claim 15, wherein packets are routed to different channels within the slice multiplexer pair based on a slice identifier.

17. The system of claim 15, the stages further comprising adjusting the total bandwidth allotment and at least one slice bandwidth allotment based on a first slice using less than its corresponding slice bandwidth allotment.

18. The system of claim 17, wherein the total bandwidth allotment decreases and a slice bandwidth allotment for a second slice increases.

19. The system of claim 15, wherein multiple tenants share the multiple slice connections between the first and second clouds.

20. The system of claim 15, the stages further comprising configuring connections between first and second service function chain steering nodes and the slice multiplexer pair, wherein a controller sends commands to configure the connections, including connecting the first and second service function chain steering nodes to a crossbar switch, and wherein the crossbar switch routes first packets for a first set of slices to a first slice multiplexer and second packets for a second set of slices to a second slice multiplexer, both the first and second slice multiplexers being in the first cloud.

\* \* \* \* \*